(12) United States Patent
Tsutsui

(10) Patent No.: US 6,590,358 B1
(45) Date of Patent: Jul. 8, 2003

(54) SERVOCONTROL DEVICE

(75) Inventor: Kazuhiko Tsutsui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/168,971
(22) PCT Filed: Nov. 1, 2000
(86) PCT No.: PCT/JP00/07702
§ 371 (c)(1), (2), (4) Date: Jun. 25, 2002
(87) PCT Pub. No.: WO02/38332
PCT Pub. Date: May 16, 2002

(51) Int. Cl.$^7$ .............................................. G05B 11/01
(52) U.S. Cl. .................. 318/560; 318/568.22; 318/629; 318/632
(58) Field of Search ................. 318/560, 632, 318/638, 630, 611, 621, 629, 568.22

(56) References Cited

U.S. PATENT DOCUMENTS

| 5,036,265 | A | * | 7/1991 | Weihrich et al. ............. | 318/632 |
| 5,418,440 | A | * | 5/1995 | Sakaguchi et al. ........... | 318/560 |
| 5,646,495 | A | * | 7/1997 | Toyozawa et al. ........... | 318/625 |
| 5,710,500 | A | * | 1/1998 | Matsuo et al. ............... | 318/632 |
| 5,936,369 | A | * | 8/1999 | Iwashita et al. .............. | 318/609 |
| 5,952,804 | A | * | 9/1999 | Hamamura et al. .......... | 318/560 |
| 6,274,994 | B2 | * | 8/2001 | Tsutsui ......................... | 318/560 |

FOREIGN PATENT DOCUMENTS

| JP | 50-149882 | | 12/1975 | | |
| JP | 61088314 | A | * | 5/1986 | ............. G05D/3/12 |
| JP | 3-235687 | | 10/1991 | | |
| JP | 5-38176 | | 2/1993 | | |
| JP | 6-102904 | | 4/1994 | | |
| JP | 06105574 | A | * | 4/1994 | ............. H02P/5/00 |
| JP | 11-24706 | | 1/1999 | | |

* cited by examiner

Primary Examiner—Robert E. Nappi
Assistant Examiner—Eduardo Colon-Santana
(74) Attorney, Agent, or Firm—Sughrue Mion, PLLC

(57) ABSTRACT

Magnitudes of a sine-wave component and a cosine-wave component of a periodical disturbance are estimated in real time during motor rotating, the sine-wave component and the cosine-wave component at the frequency of the disturbance estimated are combined, and the result is added to a current command as a correction value in real time during the normal motor driving for controlling servomotor, thereby suppressing the effect of the periodical disturbance.

5 Claims, 10 Drawing Sheets

SERVOCONTROL DEVICE

TECHNICAL FIELD

This invention relates to a servo control apparatus for driving a machine tool, etc., and in particular to a servo control apparatus for suppressing a periodical disturbance.

BACKGROUND ART

FIG. 10 is a control block diagram of a servo control apparatus comprising a periodical disturbance corrector in a speed control loop for the purpose of correcting in a system to which a periodical disturbance is added in a related art.

In FIG. 10, numeral 1 denotes a position command generation section, numeral 2 denotes a position control section, numeral 3 denotes a speed control section, numeral 4 denotes a current control section, numeral 5 denotes a power amplification circuit, numeral 6 denotes a servomotor for driving a machine system, numeral 7 decodes an encoder or detecting the rotation position of the servomotor 6, and numeral 8 denotes differentiating means for differentiating a position detection signal output by the encoder 7 to calculate speed. The encoder 7 and the differentiating means 8 make up motor speed detection means. Numeral 9 denotes a position command output from the position command generation section 1, numeral 10 denotes a position feedback signal output from the encoder 7, numeral 11 denotes a speed command output from the position control section 2, numeral 12 denotes a speed detection signal (speed feedback signal) output from the differentiating means 8, numeral 13 denotes a speed deviation signal of the difference between the speed command 11 and the speed detection signal 12, numeral 14 denotes a current command output from the speed control section 3, numeral 15 denotes a current command to which a correction value 20 output through a periodical disturbance corrector 19 is added, numeral 16 denotes a current feedback signal indicating a current flowing into the servomotor 6, numeral 17 denotes the machine system driven by the servomotor 6, and numeral 18 denotes a periodical disturbance.

In the servo control apparatus, the position feedback signal 10 of the servomotor 6 detected by the encoder 7 follows the position command signal 9 output by the position command generation section 1 for rotating the servomotor 6. To perform this operation stably at high speed, the position control section 2 generates the speed command 11 based on a deviation signal between the position command 9 and the position feedback signal 10, and the speed control section 3 outputs the current command 14 to the servomotor 6 so that the speed feedback signal generated by the differentiating means 8 based on the position feedback signal 10 follows the speed command 11. A correction value 20 for suppressing the effect of a disturbance is added to the current command 14, and the current control section and the power amplification circuit 5 control the electric current allowed to flow into the servomotor 6 so that the current feedback signal 16 indicating the value of the current flowing into the servomotor 6 follows it.

By the way, in a machine tool, the disturbance 18 caused by motor rotation, rotation of a ball screw, or a natural frequency of machine often adversely affects cutting accuracy.

Hitherto, the responsivity of a position loop or a speed loop has been enhanced for suppressing the adverse effect and to realize it, it has been necessary to increase the gains of the position control section 2 and the speed control section 3 and increase the gain of a disturbance observer.

In the methods, however, the gains are increased in all frequency bands and there is a problem of inducing machine resonance at the natural frequency of a machine system, etc.

If the proportion constant between the disturbance frequency and the motor rotation speed is already known, the technique of adding correction value 20 to the current command 14 based on the information or the like is used as shown in FIG. 10; also in this case, the amplitude and phase of the correction amount need to be determined by previously measuring the speed waveform and the current waveform when the machine is started and measuring the cutting result. Even if an appropriate value is set at one rotation speed, the correction amount (gain) and the phase deviate due to change in the disturbance frequency caused by change in the motor rotation speed during execution of normal motor control, and no effect can be produced; this is a problem.

If fluctuation caused by the periodical disturbance 18 does not appear in the speed feedback signal 12 or the current feedback signal 16 that can be detected as the servo control apparatus and the effect of the disturbance 18 appears only at a machine end, adversely affecting the cutting accuracy, a problem of being incapable of determining the appropriate values of the amplitude and phase of the correction amount or the like occurs.

Further, also in a servo system to which the cutting disturbance 18 occurring due to the number of teeth of a tool attached to a main shaft or the disturbance 18 proportional to the rotation speed of the main shaft of a factor other than the controlled shaft such as touch rotation around the shaft such as a magnetic bearing for supporting the shaft of a spindle motor of a machine tool using an electromagnet is added, hitherto, basically the responsivity of a position loop or a speed loop has been enhanced for suppressing the adverse effect and to realize it, it has been necessary to increase the gains of the position control section 2 and the speed control section 3 and increase the gain of a disturbance observer. However, the methods involve a problem of easily inducing machine resonance at the natural frequency of a machine system, etc.

DISCLOSURE OF THE INVENTION

The invention is intended for solving the problems as described above and it is an object of the invention to provide a servo control apparatus capable of appropriately suppressing disturbances caused by various factors in real time.

Then, according to the invention, there is provided a servo control apparatus comprising detection means for detecting the position and speed of a servomotor, a position control section for generating a speed command based on the difference between a position command and a position feedback signal output by the above-mentioned detection means, a speed control section for generating a current command based on the difference between the above-mentioned speed command and a speed feedback signal, a current control section for controlling an electric current allowed to flow into the above-mentioned motor based on the above-mentioned current command, and a periodical disturbance estimator, if a disturbance having a frequency proportional to the rotation speed of the above-mentioned motor is loaded on (added to) a servo system containing a driven machine, the periodical disturbance estimator for inputting information of a proportionality constant between the disturbance frequency and the motor rotation speed, motor position information, and a difference signal between the above-mentioned speed command and the speed feedback signal and estimating magnitudes of a sine-wave component and a cosine-wave component at the frequency of the disturbance in real time during the normal motor driving, wherein the sine-wave component and the cosine-wave component at the frequency of the disturbance estimated are combined and the result is added to the above-mentioned current command as a correction value in real time during the normal motor driving.

Thus, if the disturbance having a frequency proportional to the motor rotation speed is loaded on (added to) the servo system containing the driven machine, the effect of the disturbance can be suppressed in real time during the normal motor driving.

According to the invention, there is provided a servo control apparatus comprising detection means for detecting the position and speed of a servomotor, a position control section for generating a speed command based on the difference between a position command and a position feedback signal output by the above-mentioned detection means, a speed control section for generating a current command based on the difference between the above-mentioned speed command and a speed feedback signal, a current control section for controlling an electric current allowed to flow into the above-mentioned motor based on the above-mentioned current command, and a periodical disturbance estimater, if a disturbance loaded on (added to) a servo system has a machine-proper fixed frequency, the periodical disturbance estimater for inputting information of the machine-proper frequency and a difference signal between the speed command and the speed feedback signal and estimating magnitudes of a sine-wave component and a cosine-wave component at the frequency of the disturbance in real time during the normal motor driving, wherein the sine-wave component and the cosine-wave component at the frequency of the disturbance estimated are combined and the result is added to the above-mentioned current command as a correction value in real time during the normal motor driving.

Thus, if the disturbance added to the servo system has the machine-proper fixed frequency, the effect of the disturbance can be suppressed.

According to the invention, there is provided a servo control apparatus comprising detection means for detecting the position and speed of a servomotor, a position control section for generating a speed command based on the difference between a position command and a position feedback signal output by the above-mentioned detection means, a speed control section for generating a current command based on the difference between the above-mentioned speed command and a speed feedback signal, a current control section for controlling an electric current allowed to flow into the above-mentioned motor based on the above-mentioned current command, and a periodical disturbance estimater, if a disturbance having a frequency proportional to the rotation speed of the above-mentioned motor is loaded on (added to) a servo system containing a driven machine, the periodical disturbance estimater for inputting information of a proportionality constant between the disturbance frequency and the motor rotation speed, motor position information, and an output signal from an external displacement sensor attached to a machine end and estimating magnitudes of a sine-wave component and a cosine-wave component at the frequency of the disturbance in real time during the normal motor driving, wherein the sine-wave component and the cosine-wave component at the frequency of the disturbance estimated are combined and the result is added to the above-mentioned current command as a correction value in real time during the normal motor driving.

Thus, if fluctuation caused by the periodical disturbance having a frequency proportional to the motor rotation speed does not appear in the speed feedback signal or a current feedback signal that can be detected as the servo control apparatus and the effect of the disturbance appears only at the machine end, adversely affecting the cutting accuracy, the effect of the disturbance can be suppressed.

According to the invention, there is provided a servo control apparatus comprising detection means for detecting the position and speed of a servomotor, a position control section for generating a speed command based on the difference between a position command and a position feedback signal output by the above-mentioned detection means, a speed control section for generating a current command based on the difference between the above-mentioned speed command and a speed feedback signal, a current control section for controlling an electric current allowed to flow into the above-mentioned motor based on the above-mentioned current command, and a periodical disturbance estimater, if a disturbance loaded on (added to) a servo system has a machine-proper fixed frequency, the periodical disturbance estimater for inputting information of the machine-proper frequency and an output signal from an external displacement sensor attached to a machine end and estimating magnitudes of a sine-wave component and a cosine-wave component at the frequency of the disturbance in real time during the normal motor driving, wherein the sine-wave component and the cosine-wave component at the frequency of the disturbance estimated are combined and the result is added to the above-mentioned current command as a correction value in real time during the normal motor driving.

Thus, if fluctuation caused by the periodical disturbance having the machine-proper fixed frequency does not appear in the speed feedback signal or a current feedback signal that can be detected as the servo control apparatus and the effect of the disturbance appears only at the machine end, adversely affecting the cutting accuracy, the effect of the disturbance can be suppressed.

According to the invention, there is provided a servo control apparatus comprising detection means for detecting the position and speed of a servomotor, a position control section for generating a speed command based on the difference between a position command and a position feedback signal output by the above-mentioned detection means, a speed control section for generating a current command based on the difference between the above-mentioned speed command and a speed feedback signal, a current control section for controlling an electric current allowed to flow into the above-mentioned motor based on the above-mentioned current command, detection means for detecting rotation speed of a main shaft, and a periodical disturbance estimater, if a disturbance proportional to the rotation speed of the main shaft is added to a servo system, the periodical disturbance estimater for inputting information of a proportionality constant between the disturbance frequency and the rotation speed of the main shaft, information of the rotation speed of the main shaft, and a difference signal between the above-mentioned speed command and the speed feedback signal and estimating magnitudes of a sine-wave component and a cosine-wave component at the frequency of the disturbance in real time during the normal motor driving, wherein the sine-wave component and the cosine-wave component at the frequency of the disturbance estimated are combined and the result is added to the above-mentioned current command as a correction value in real time during the normal motor driving.

Thus, if the disturbance added to the servomotor is a disturbance caused by the rotation speed of the spindle motor and the main shaft control apparatus controlled by the same numerical control apparatus (for example, cutting disturbance occurring due to the number of teeth of a tool attached to a main shaft or disturbance proportional to the rotation speed of the main shaft of a factor other than the controlled shaft such as touch rotation around the shaft such as a magnetic bearing for supporting the shaft of a spindle motor of a machine tool using an electromagnet), the effect of the disturbance can be suppressed.

BEST MODE FOR CARRYING OUT THE INVENTION

Embodiment 1.

An embodiment 1 of the invention will be discussed with FIGS. 1 to 4.

When a disturbance having a frequency proportional to the motor rotation speed is loaded on (added to) a servo system containing a driven machine, the embodiment 1 is intended for suppressing the effect of the disturbance.

Figure 1:
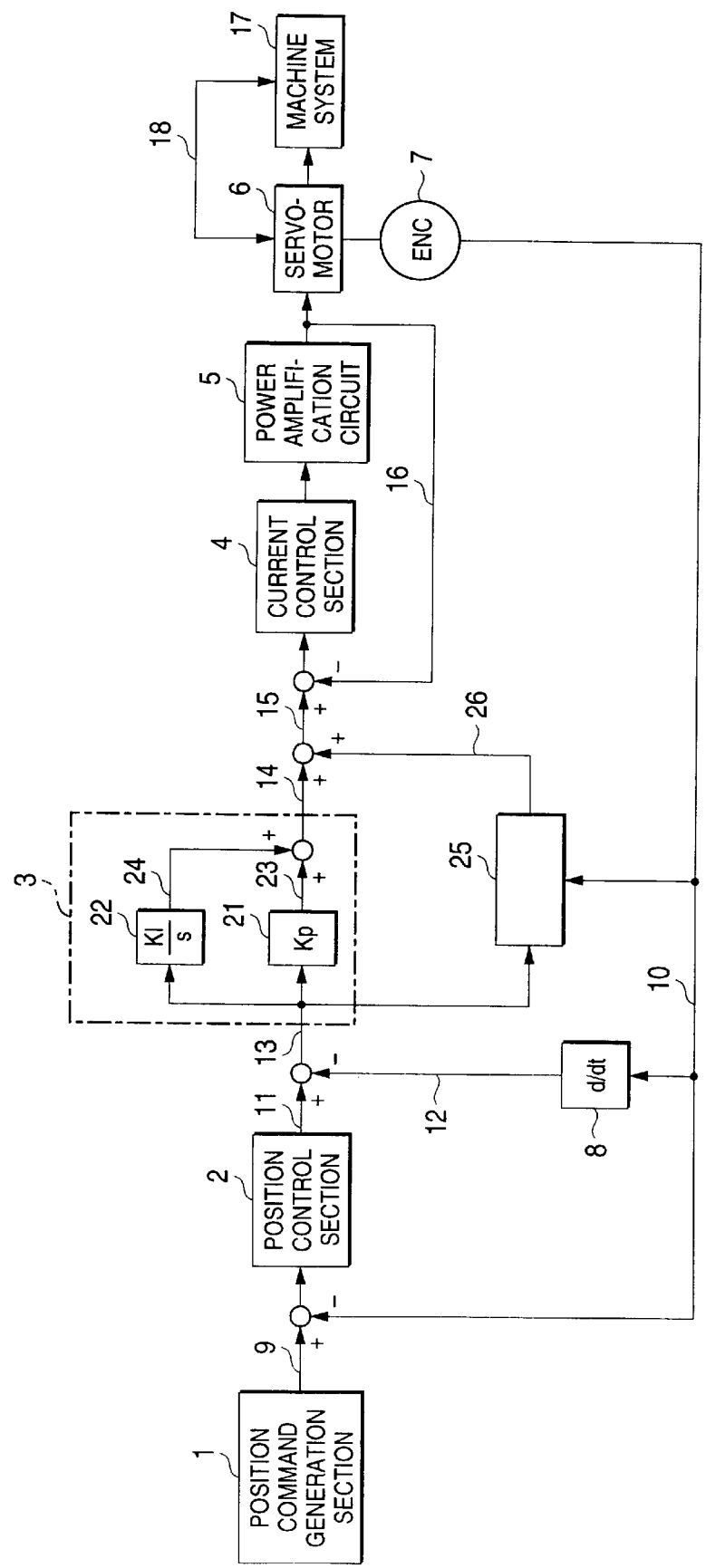
FIG. 1 is a block diagram to show a servo control apparatus according to an embodiment 1 of the invention.
Figure 10:
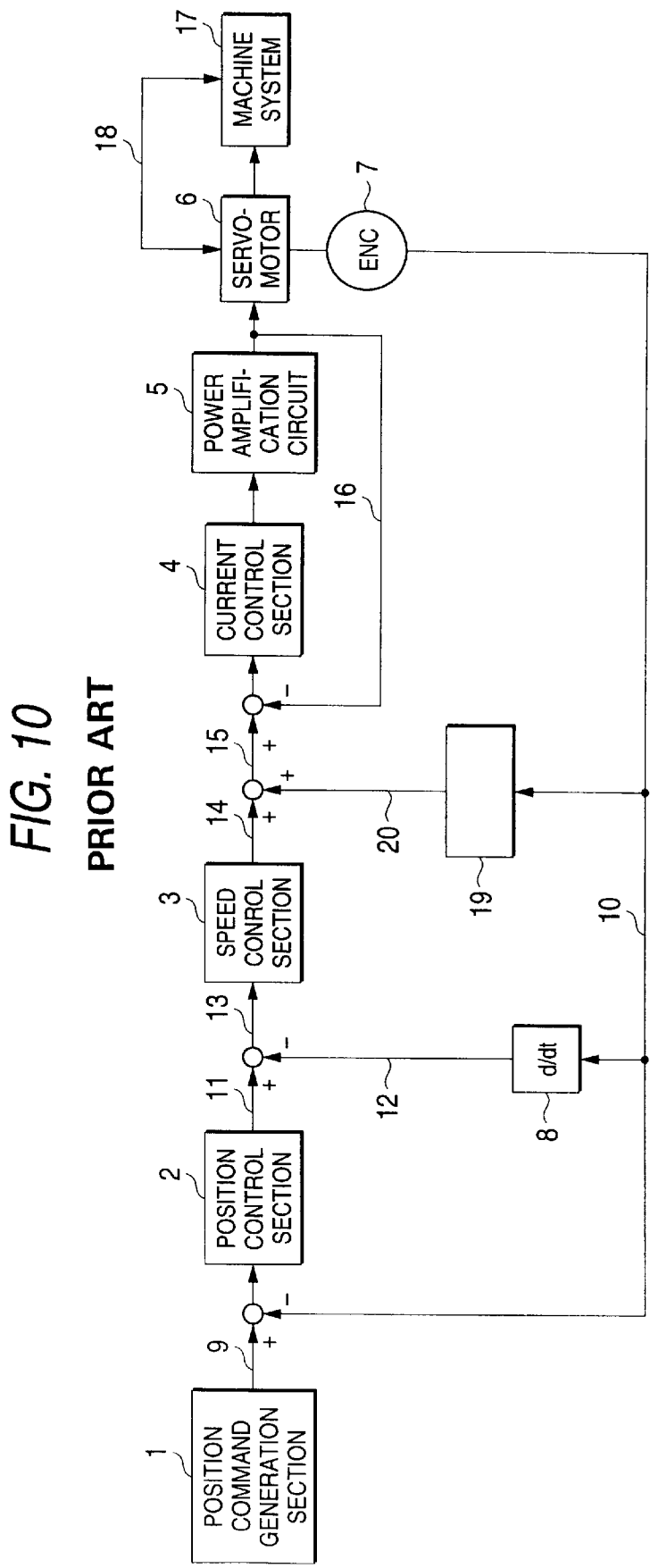
FIG. 10 is a block diagram to show a servo control apparatus in a related art.

FIG. 1 is a block diagram of a servo control apparatus according to the embodiment 1 of the invention. The figure is similar to FIG. 10 to show the apparatus in the related art except that a speed control section 3 is represented as PI control of a general control system, that the sum of output 23 of a proportional controller 21 and output 24 of an integration controller 22 becomes a current command before a correction value 26 of a periodical disturbance 18 is added, or that a periodical disturbance estimater 25 to which a speed deviation signal 13 and output 10 of a detector 7 indicating the position of a servomotor 6 are input for calculating the correction value of the periodical disturbance 18 is provided.

Figure 2:
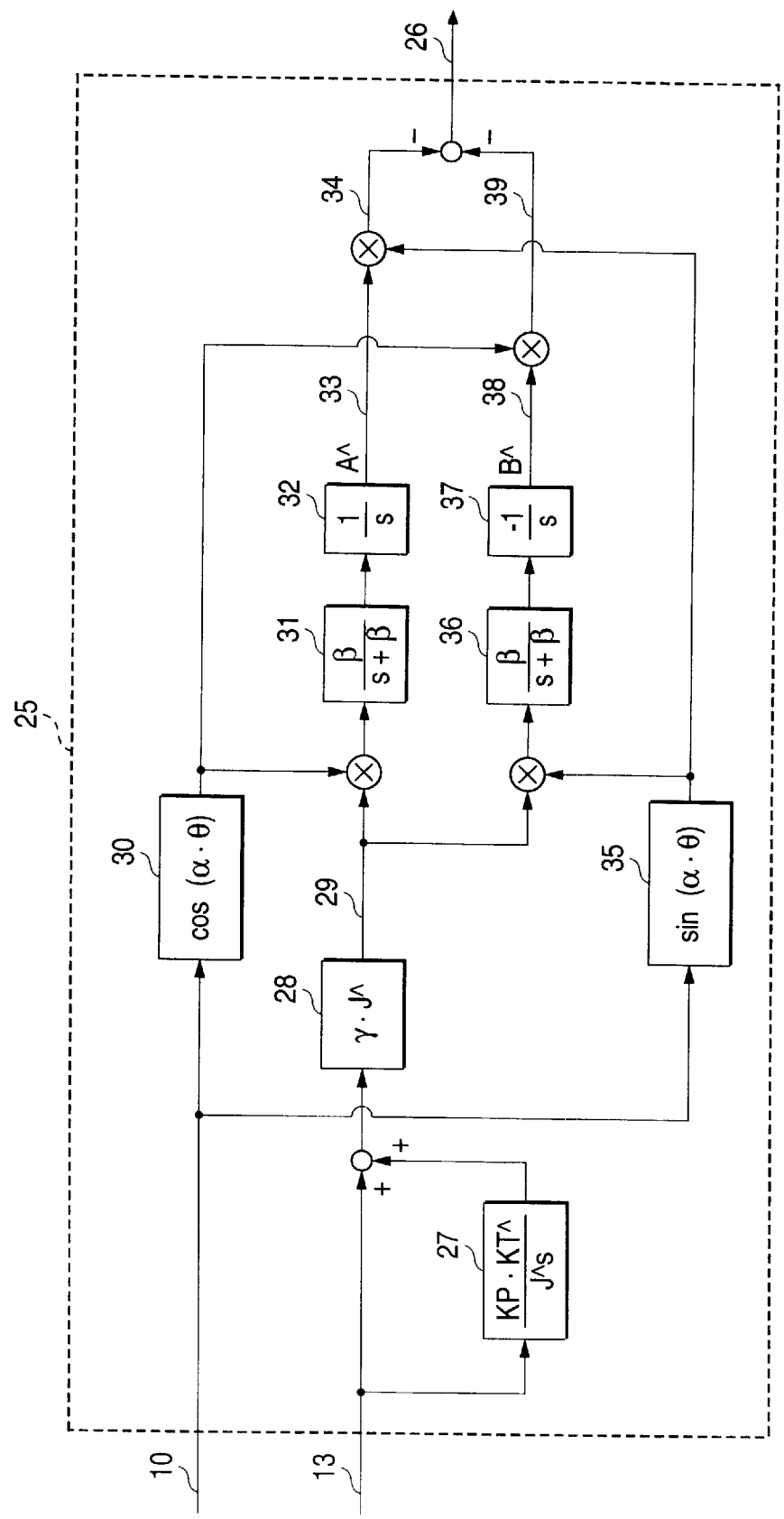
FIG. 2 is a block diagram to show the details of a periodical disturbance estimater in the servo control apparatus according to the embodiment 1 of the invention.
Figure 3:
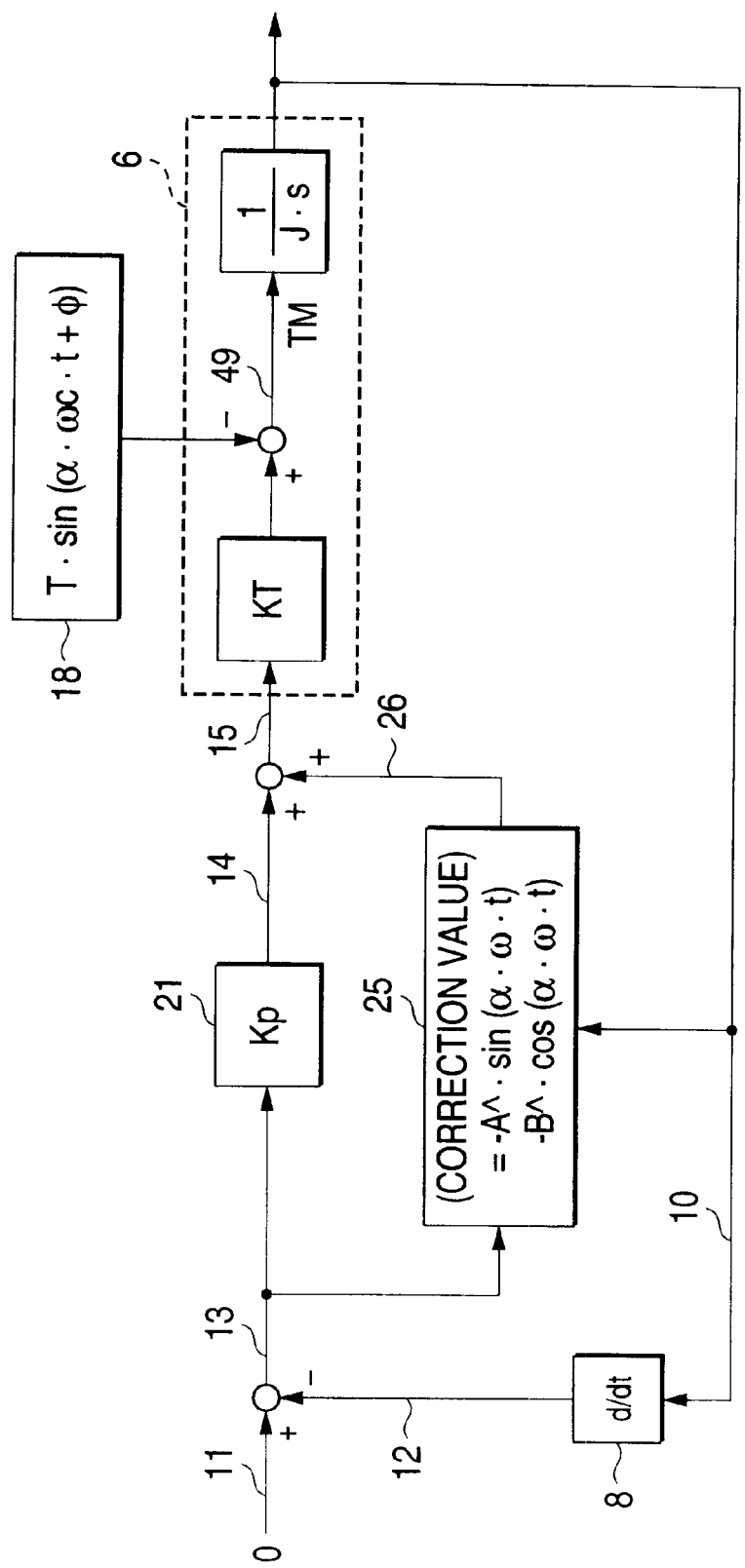
FIG. 3 is a block diagram to show a speed control loop in the servo control apparatus according to the embodiment 1 of the invention.

FIG. 2 is a block diagram to show the details of the periodical disturbance estimater 25. In the figure, the speed deviation signal 13 is added to output of an integrator 27 having a known motor torque constant parameter $KT^\wedge$, an inertia parameter $J^\wedge$ around a motor shaft containing a machine, and a gain KP of the proportional controller 21 as coefficients and then the result is multiplied by a gain 28 (gain having a parameter (periodical disturbance estimation time constant) $\gamma$ and inertia parameter $J^\wedge$ as coefficients) to produce output 29. In the description that follows, the symbols representing the parameters such as KT and J mentioned above with the prefix "^" represent calculation values or estimation values relative to the true values.

Letting the gain of a sine-wave component forming a part of the correction value of the periodical disturbance 18 be $A^\wedge$ and the gain of a cosine-wave component be $B^\wedge$, the sine-wave component gain $A^\wedge$ can be detected by multiplying the output 29 by $\cos(\alpha\cdot\theta)$ indicated by numeral 30, passing the result through a low-pass filter 31, and integrating the result by an integrator 32. Here, $\alpha$ is a proportionality constant between known disturbance frequency and motor rotation speed and $\theta$ is motor position (motor angle information).

Likewise, the cosine-wave component gain $B^\wedge$ can be detected by multiplying the output 29 by $\sin(\alpha\cdot\theta)$ indicated by numeral 35, passing the result through a low-pass filter 36, and integrating the result by an integrator 37 having −1 as a coefficient.

Therefore, the sine-wave component gain $A^\wedge$ and the cosine-wave component gain $B^\wedge$ are multiplied by $\sin(\alpha\cdot\theta)$ and $\cos(\alpha\cdot\theta)$ respectively and the results are summed, whereby the correction value 26 of the periodical disturbance 18 can be calculated.

The signal is added to the current command 14 to generate the current command 15 given to the actual servomotor 6, thereby making it possible to suppress the effect of the disturbance 18 having the frequency proportional to the motor rotation speed loaded on (added to) the servo system containing the machine in real time during the normal motor driving.

Next, the reason why the above-described periodical disturbance estimater 25 can suppress the disturbance having the frequency proportional to the motor rotation speed in real time during the normal motor driving is as follows:

To being with, if the disturbance 18 added to the servomotor 6 is a disturbance having a frequency proportional to the rotation speed of the servomotor, the disturbance generally is represented by the following expression. In expression (1), T is amplitude, $\phi$ is phase, and $\alpha$ is a proportionality constant between known disturbance frequency and motor rotation speed; for example, to remove cutting disturbance, $\alpha$ becomes the number of edges of a tool or to improve the speed ripple of a motor having a large cogging torque, $\alpha$ generally becomes the least common multiple between the number of poles of the motor and the number of slots. $\theta$ denotes motor position (motor angle information).

$$\text{(Disturbance 18)} = T \cdot \sin(\alpha\cdot\theta+\phi) \tag{1}$$

The correction value 26 at this time is represented by the following expression $$\text{(Correction value 26)} = -A^\wedge\cdot\sin(\alpha\cdot\theta) - B^\wedge\cdot\cos(\alpha\cdot\theta) \tag{2}$$

Here, assuming that the servomotor rotates at one rotation speed, expressions (1) and (2) can be replaced with the following expression. $\omega$ is angular speed of the motor and t denotes the time.

$$\text{(Disturbance 18)} = T \cdot \sin(\alpha\cdot\omega\cdot t+\phi) \tag{3}$$

$$\text{(Correction value 26)} = -A^\wedge\cdot\sin(\alpha\cdot\omega\cdot t) - B^\wedge\cdot\cos(\alpha\cdot\omega\cdot t) \tag{4}$$

At this time, the responsivity of a current loop with the current command 15 as input and the current feedback 16 as output is sufficiently higher than the responsivity of a speed loop and considering with the speed loop from the speed command 11 to the speed feedback 12, if the speed command is 0, torque TM applied to the motor 6 becomes expression (5) containing disturbance. Here, to simplify the calculation, assuming that gain KI of the integration controller 22=0, FIG. 1 can be represented as a block diagram of FIG. 3.

(Torque applied to motor: $TM$)=[1/{1

+KP·KT/($J$·$s$)}]·{(−

KT·A^T cos ϕ)·sin(α·ω

·$t$)+(−$KT$·$B$^−$T$ sin ϕ)·cos(α·ω·$t$) (5)

Here, KT is torque constant of actual motor and J is inertia around the motor shaft containing the actual machine. At this time, the gain A^ of the sine-wave component calculated by the periodical disturbance estimator 25 can be represented as in expression (6).

A^={1/$s$}·{β/($s$

+β)}·cos(α·ω·$t$)·γ

·$J$^·{1

+KP·KT^/($J$^·$s$)}·

[0−{1/($J$·$s$)}·$TM$]=

{1/$s$}·{β/($s$+β)}·cos(α·

ω·$t$)·γ·$J$^·{1

+KP·KT^/($J$^·$s$)}·

{−1/($J$·$s$)·[1/{1+$KP$·

KT/($J$·$s$)}]·{(−$KT$·$A$^

−T cos ϕ)sin(α·ω·$t$)+(−

KT·B^−T sin ϕ)·cos(α·ω

·$t$) (6)

Here, assuming that KT^≈KT and that J^≈J, expression (6) can be represented like expression (7).

A^={1/$s$}·{β/($s$

+β)}·cos(α·ω·$t$)·γ

·(−1/$s$){·{(−$KT$·$A$^

−T cos ϕ)·sin(α·ω·$t$)+(−

KT·B^−T sin ϕ)·cos(α·ω

·$t$)}=1/$s$·{β/($s$+β)}

·γ·[{(−$KT$·$A$^−T cos ϕ)/(2α·ω)}·{1

+cos(2α·ω·$t$)}−{(−

KT·B^T sin ϕ)/(2α·ω)}

·sin(2α·ω·$t$)]={1/$s$

}·γ·{(−$KT$·$A$^$T$ cos ϕ)/(2α·ω)} (7)

Therefore,

A^={γ·$KT$/(2α·ω)}/[$s$+{γ·$KT$/(2α·ω)}]·(−$T$ cos ϕ)/$KT$ (8)

Here, assuming that the gain A^ of the sine-wave component is estimated and corrected only when the servomotor rotates at one revolution speed ω0 or more, the gain A^ of the sine-wave component converges to (−T cos ϕ)/KT with time constant (2α·ω )/(γ KT).

A^→(−T cos ϕ)/KT (9)

Likewise, the gain B^ of the cosine-wave component calculated by the periodical disturbance estimator 25 can be represented by expression (10).

B^={1/$s$}·{β/($s$+β)}

·sin ω·$t$·γ·$J$^·{1

+KP·KT^/($J$^·$s$)}·

[0−{1/($J$·$s$)}·$TM$]

={1/$s$}·{β/($s$+β)}

·sin ω·$t$·γ·$J$^·

{1+$KP$·$KT$^/($J$^·$s$)}

·{−1/($J$·$s$)·[1/{1

+KP·KT/($J$·$s$)}]·{(−

KT·A^−T cos ϕ)·sin(α·

ω·$t$)+(−$KT$·$B$^−$T$ sin ϕ)·cos(α·ω·$t$)} (10)

Here, assuming that KT^ KT and that J^ J, expression (10) can be represented like expression (11).

B^={1/$s$}·{β/( $s$+β)}·sin(α·ω·$t$)·γ·

(−1/$s$)·{(−$KT$·$A$^$T$ cos ϕ)·sin(α·ω·$t$)+

(−$KT$·$B$^$T$ sin ϕ)·cos(α·ω

·$t$)}={1/$s$}·{β/($s$

+β)}·γ·[{(−$KT$·$A$^−$T$ cos ϕ)/(2α·ω)}·sin(2α·ω

·$t$)]−{(−$KT$·$B$^−$T$ sin ϕ)/(2α·ω)}·{1

−cos(2α·ω·$t$)}]={1/$s$

}·γ·{(−$KT$·$B$^−$T$ sin ϕ)/(2α·ω)} (11)

Therefore, $$B\hat{} = \{\gamma \cdot KT/(2\alpha \cdot \omega)\}/[s + \{\gamma \cdot KT/(2\alpha \cdot \omega)\}] \cdot (-T \sin \phi)/KT \quad (12)$$

Here, assuming that the gain B^ of the cosine-wave component is estimated and corrected only when the servomotor rotates at one revolution speed ω0 or more, the gain B^ of the cosine-wave component converges to (−T sin φ)/KT with time constant (2α·ω0)/(γ·KT).

$$B\hat{} \rightarrow (-T \sin \phi)/KT \quad (13)$$

Therefore, from expressions (9), (13), and (5), the effect of the disturbance is canceled and the torque TM applied to the motor is $$TM \rightarrow 0$$

the effects of the speed deviation and the position deviation caused by the disturbance are eliminated.

Figure 4:
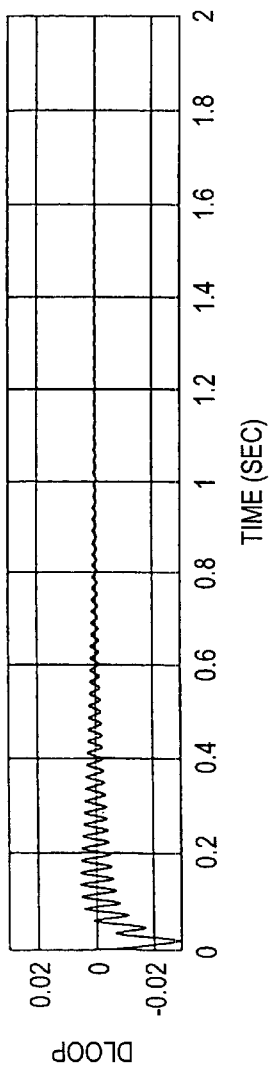
FIG. 4 is a drawing to show the simulation result to show the effectiveness of the embodiment 1 of the invention.
Figure 4:
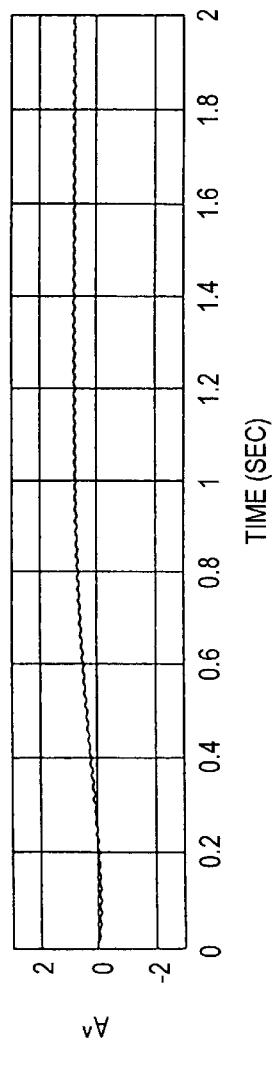
Figure 4:
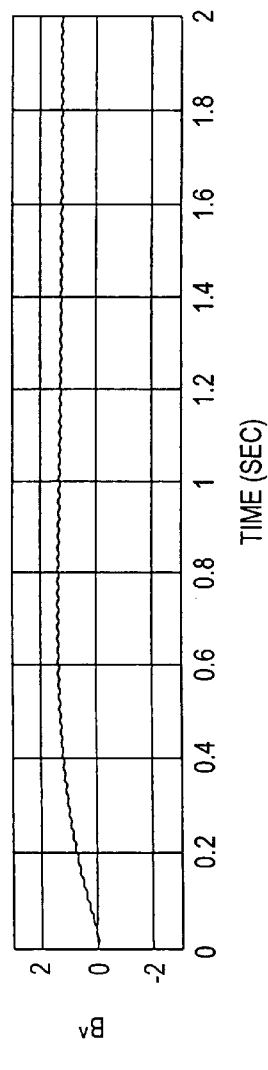

FIG. 4 shows the result of simulation conducted to show the effectiveness of the servo control apparatus configured as in FIGS. 1 and 2 for the disturbance 18 having the frequency proportional to the motor rotation speed. Here, it is assumed that when the rotation speed of the servomotor is one constant value, periodical disturbance (frequency of 40 Hz and phase φ of 225 deg) having an amplitude of 10 kgf cm with stationary load of 30 kgf cm as the magnitude of the disturbance 18 is applied; the upper stage shows the position deviation (Dloop), the intermediate stage shows the estimation value of the gain A^ of the sine-wave component, and the lower stage shows the estimation value of the gain B^ of the cosine-wave component.

As seen in FIG. 4, it was acknowledged that the vibration appearing as the position deviation just after the disturbance 18 is loaded (added) is attenuated as the estimation of the gain A^ of the sine-wave component, the gain B^ of the cosine-wave component converges.

Embodiment 2.

Next, an embodiment 2 of the invention will be discussed with FIGS. 5 and 6.

When a disturbance 18 applied to a servomotor 6 has a machine-proper fixed frequency, the embodiment 2 is intended for suppressing the effect of the disturbance 18.

Figure 5:
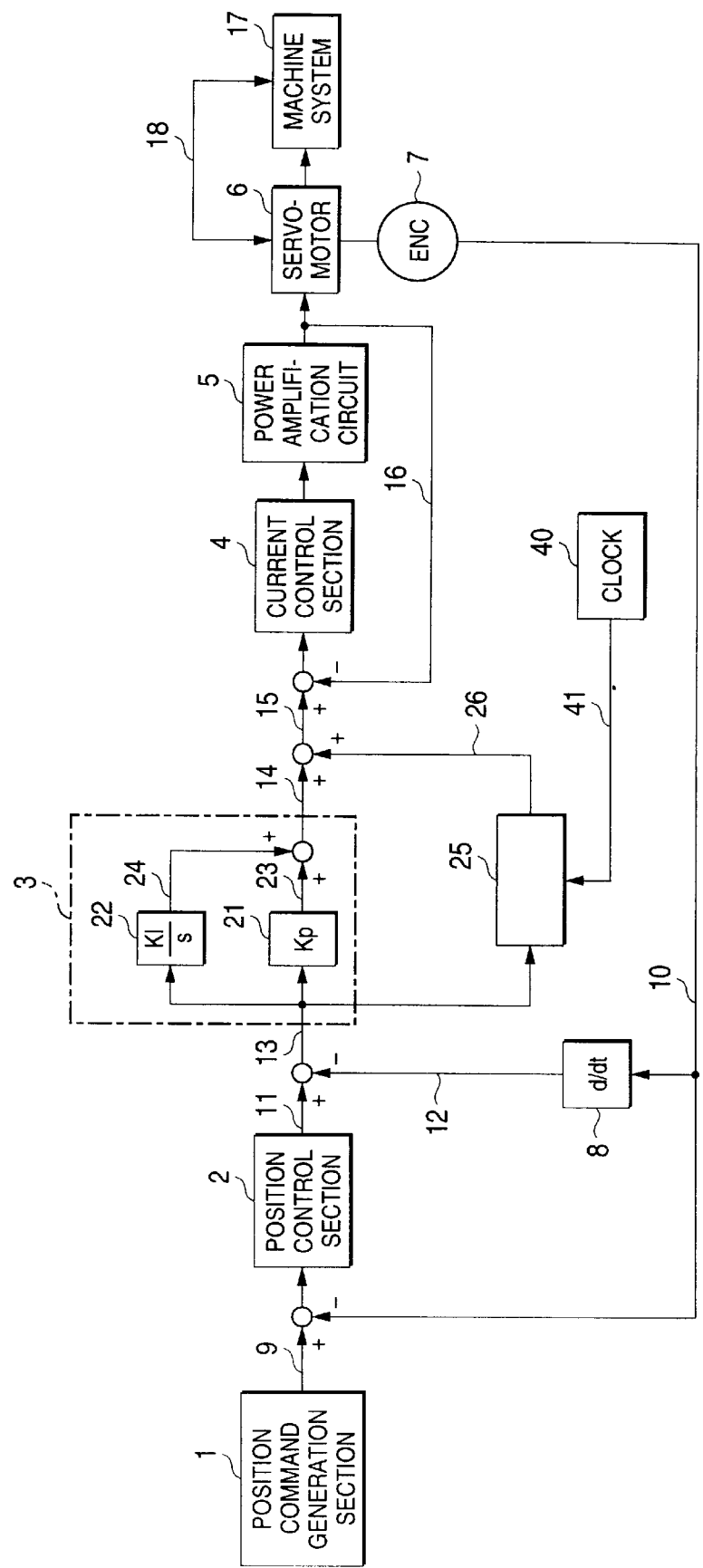
FIG. 5 is a block diagram to show a servo control apparatus according to an embodiment 2 of the invention.

FIG. 5 is a block diagram of a servo control apparatus according to the embodiment 2 of the invention; it is similar to FIG. 1 except that a periodical disturbance estimater 25 for calculating the correction value of the periodical disturbance 18 inputs a period signal 41 provided from a clock 40 in the servo control apparatus in place of a position signal 10.

Figure 6:
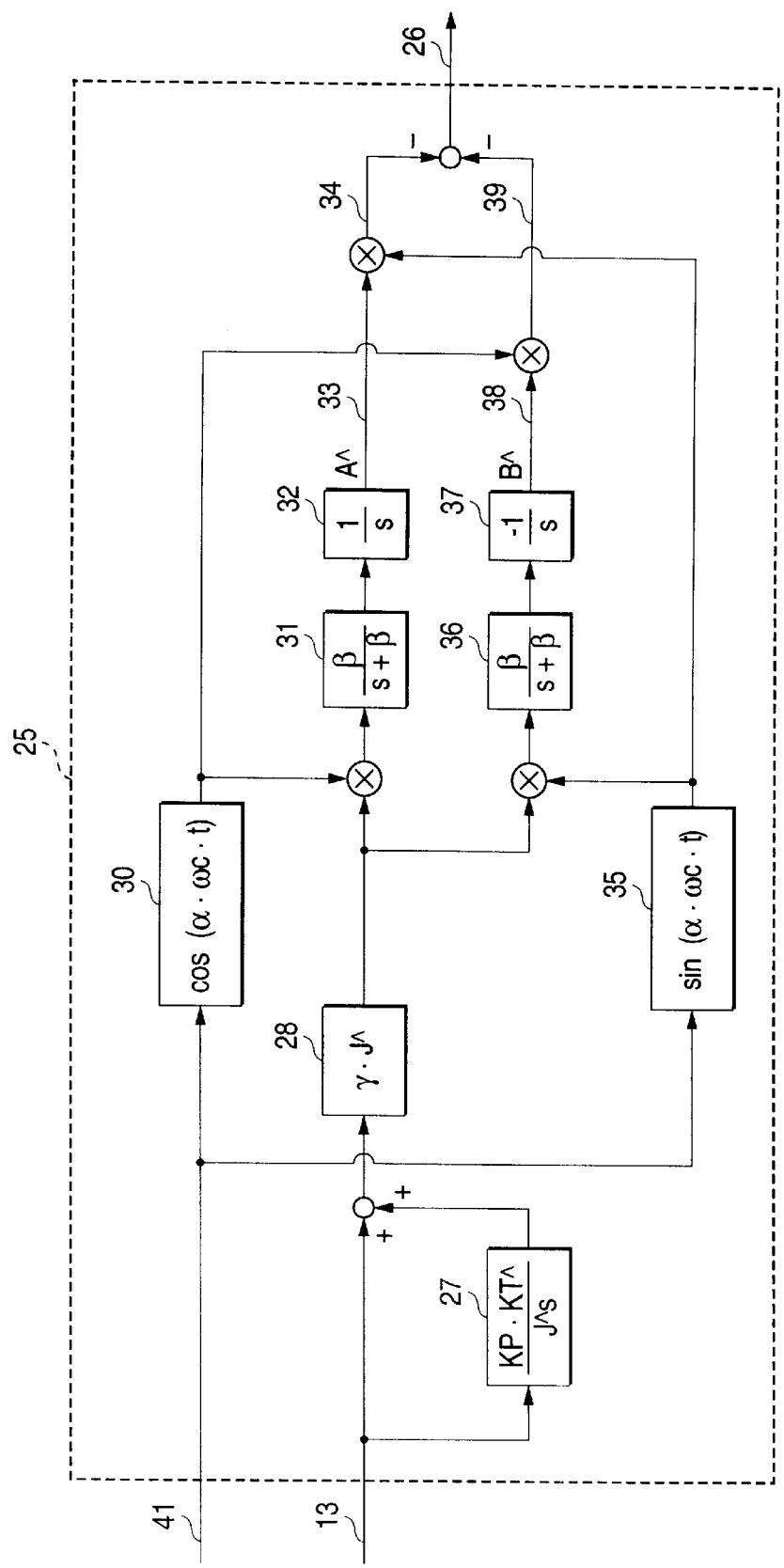
FIG. 6 is a block diagram to show the details of a periodical disturbance estimater in the servo control apparatus according to the embodiment 2 of the invention.

FIG. 6 is a block diagram to show the details of the periodical disturbance estimater 25. When the disturbance 18 applied to the servomotor has a machine-proper fixed frequency, the periodical disturbance estimater 25 creates information α of the proper frequency and known resonance frequency of machine system using the period signal 41 provided from the clock 40 in the servo control apparatus, there by creating cos(α·ωc·t) and sin(α·ωc·t). As in the embodiment 1, it inputs a difference signal 13 between a speed command and a speed feedback signal, estimates gain A^ of a sine-wave component and gain B^ of a cosine-wave component forming the correction value of the periodical disturbance 18, multiplies the sine-wave component gain A^ and the cosine-wave component gain B^ by sin(α·ωc·t) and cos(α·ωc·t) respectively, and sums the results, thereby calculating correction value 26 of the periodical disturbance 18 having the machine-proper fixed frequency.

Therefore, the correction value 26 is added to a current command 14 to generate a current command 15 given to the actual servomotor, thereby making it possible to suppress the effect of the disturbance 18 having the frequency proper to the machine system loaded on (added to) the servo system containing the machine in real time during the normal motor driving.

Embodiment 3.

Next, an embodiment 3 of the invention will be discussed with FIG. 7.

If fluctuation caused by a periodical disturbance 18 having a frequency proportional to the motor rotation speed does not appear in a speed feedback signal 12 or a current feedback signal 16 that can be detected as a servo control apparatus and the effect of the disturbance 18 appears only at a machine end, adversely affecting the cutting accuracy, the embodiment 3 is intended for suppressing the effect of the disturbance 18.

Figure 7:
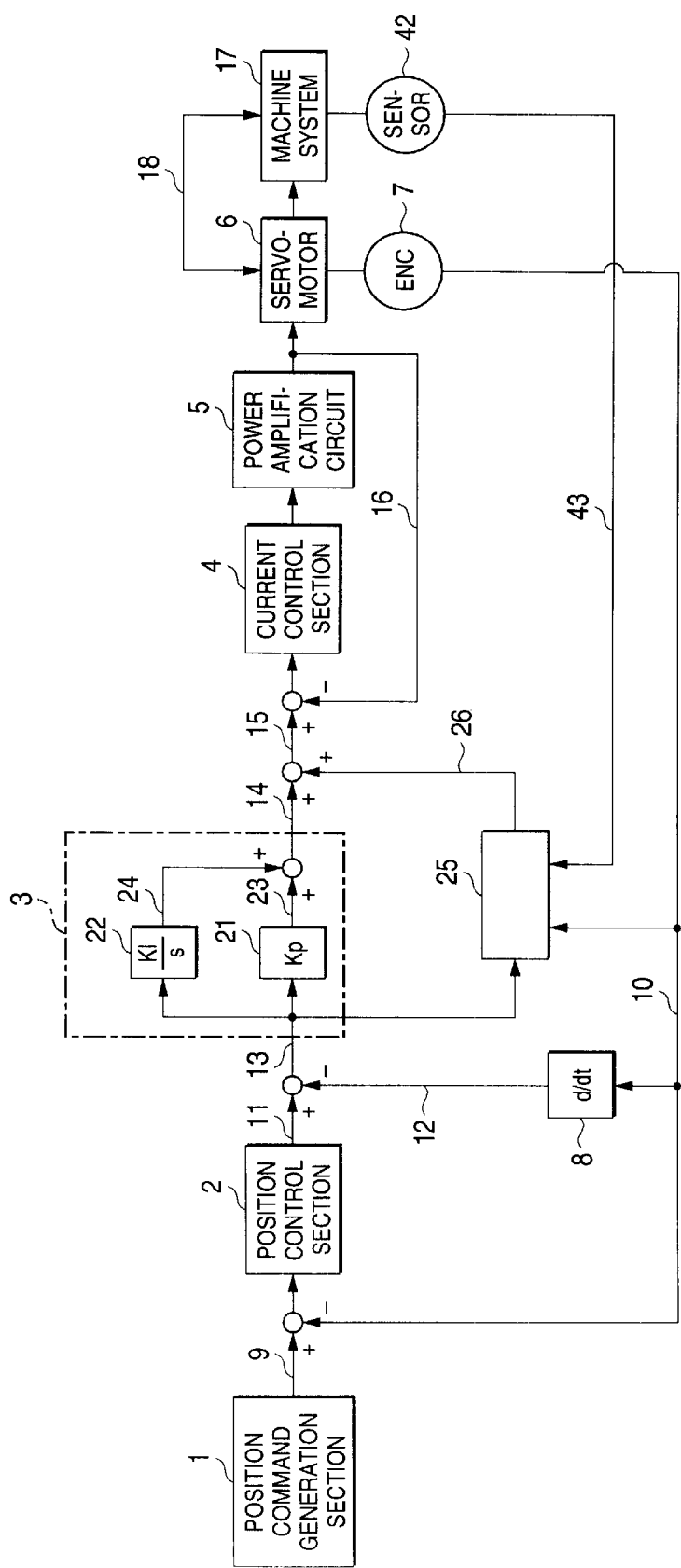
FIG. 7 is a block diagram to show a servo control apparatus according to an embodiment 3 of the invention.

FIG. 7 is a block diagram of a servo control apparatus according to the embodiment 7 of the invention; it is similar to FIG. 1 except that a periodical disturbance estimater 25 for calculating the correction value of the periodical disturbance 18 inputs an output signal 43 of an external sensor 42 being attached to a machine end for detecting its vibration component in place of a deviation signal 14.

The internal configuration of the periodical disturbance estimater 25 is similar to that in FIG. 2 except that the output signal 43 of the external sensor 42 is input in place of the feedback signal 13 in FIG. 2.

If fluctuation caused by the periodical disturbance 18 having a frequency proportional to the motor rotation speed does not appear in the speed feedback signal 12 or the current feedback signal 16 that can be detected as the servo control apparatus and the effect of the disturbance 18 appears only at the machine end, adversely affecting the cutting accuracy, the apparatus shown in FIG. 7 inputs the output signal 43 of the external sensor 42 being attached to the machine end for detecting its vibration component, information of a proportionality constant α between known disturbance frequency and motor rotation speed, and output 10 of a detector 7 indicating the position of a servomotor 6 and as in the embodiment 1, estimates gain A^ of a sine-wave component and gain B^ of a cosine-wave component forming the correction value of the periodical disturbance 18.

It multiplies the sine-wave component gain A^ and the cosine-wave component gain B^ by sin(α·θ) and cos(α·θ) respectively and sums the results, thereby calculating correction value 26 of the periodical disturbance 18.

Therefore, the correction value 26 is added to a current command 14 to generate a current command 15 given to the actual servomotor, whereby even if fluctuation caused by the periodical disturbance 18 having a frequency proportional to the motor rotation speed does not appear in the speed feedback signal 12 or the current feedback signal 16 that can be detected as the servo control apparatus and the effect of the disturbance 18 appears only at the machine end, adversely affecting the cutting accuracy, it is made possible to suppress the effect of the disturbance in real time during the normal motor driving.

Embodiment 4.

Next, an embodiment 4 of the invention will be discussed with FIG. 8.

If fluctuation caused by a periodical disturbance 18 having a machine-proper fixed frequency does not appear in a speed feedback signal 12 or a current feedback signal 16 that can be detected as a servo control apparatus and the effect of the disturbance 18 appears only at a machine end, adversely affecting the cutting accuracy, the embodiment 4 is intended for suppressing the effect of the disturbance 18.

Figure 8:
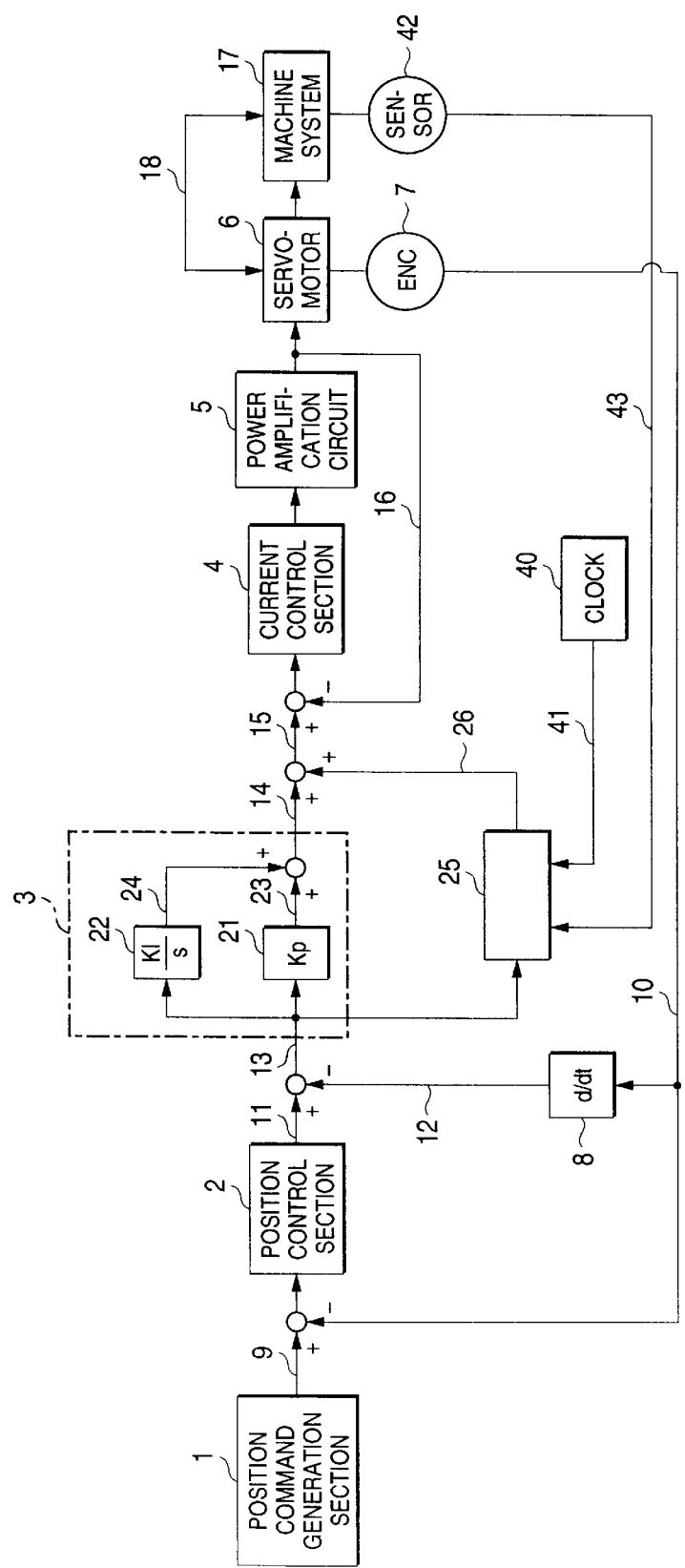
FIG. 8 is a block diagram to show a servo control apparatus according to an embodiment 4 of the invention.

FIG. 8 is a block diagram of a servo control apparatus according to the embodiment 7 of the invention; it is similar to FIG. 5 except that a periodical disturbance estimater 25 for calculating the correction value of the periodical disturbance 18 inputs an output signal 43 of an external sensor 42 being attached to a machine end for detecting its vibration component in place of a deviation signal 13.

The internal configuration of the periodical disturbance estimater 25 is similar to that in FIG. 6 except that the output signal 43 of the external sensor 42 is input in place of the feedback signal 13 in FIG. 6.

If fluctuation caused by the periodical disturbance 18 having a machine-proper fixed frequency does not appear in the speed feedback signal 12 or the current feedback signal 16 that can be detected as the servo control apparatus and the effect of the disturbance 18 appears only at the machine end, adversely affecting the cutting accuracy, the apparatus shown in FIG. 8 creates information $\alpha$ of the proper frequency and known resonance frequency of machine system using a period signal 41 provided from a clock 40 in the servo control apparatus, thereby creating $\cos(\alpha \cdot \omega c \cdot t)$ and $\sin(\alpha \cdot \omega c \cdot t)$. As in the embodiment 2, it inputs the output signal 43 of the external sensor 42 being attached to the machine end for detecting its vibration component, estimates gain $A^\wedge$ of a sine-wave component and gain $B^\wedge$ of a cosine-wave component forming the correction value of the periodical disturbance 18, multiplies the sine-wave component gain $A^\wedge$ and the cosine-wave component gain $B^\wedge$ by $\sin(\alpha \cdot \omega c \cdot t)$ and $\cos(\alpha \cdot \omega c \cdot t)$ respectively, and sums the results, thereby calculating correction value 26 of the periodical disturbance 18.

Therefore, the correction value 26 is added to a current command 14 to generate a current command 15 given to the actual servomotor, whereby even if fluctuation caused by the periodical disturbance 18 having a machine-system-proper frequency does not appear in the speed feedback signal 12 or the current feedback signal 16 that can be detected as the servo control apparatus and the effect of the disturbance 18 appears only at the machine end, adversely affecting the cutting accuracy, it is made possible to suppress the effect of the disturbance in real time during the normal motor driving. Embodiment 5.

Next, an embodiment 5 of the invention will be discussed with FIG. 9.

If a disturbance 18 added to a servomotor 6 is a disturbance caused by the rotation speed of a spindle motor 46 and a main shaft control apparatus 45 controlled by the same numerical control apparatus 44 (for example, cutting disturbance occurring due to the number of teeth of a tool attached to a main shaft or disturbance proportional to the rotation speed of the main shaft of a factor other than the controlled shaft such as touch rotation around the shaft such as a magnetic bearing for supporting the shaft of a spindle motor of a machine tool using an electromagnet), the embodiment 5 is intended for suppressing the effect of the disturbance 18.

Figure 9:
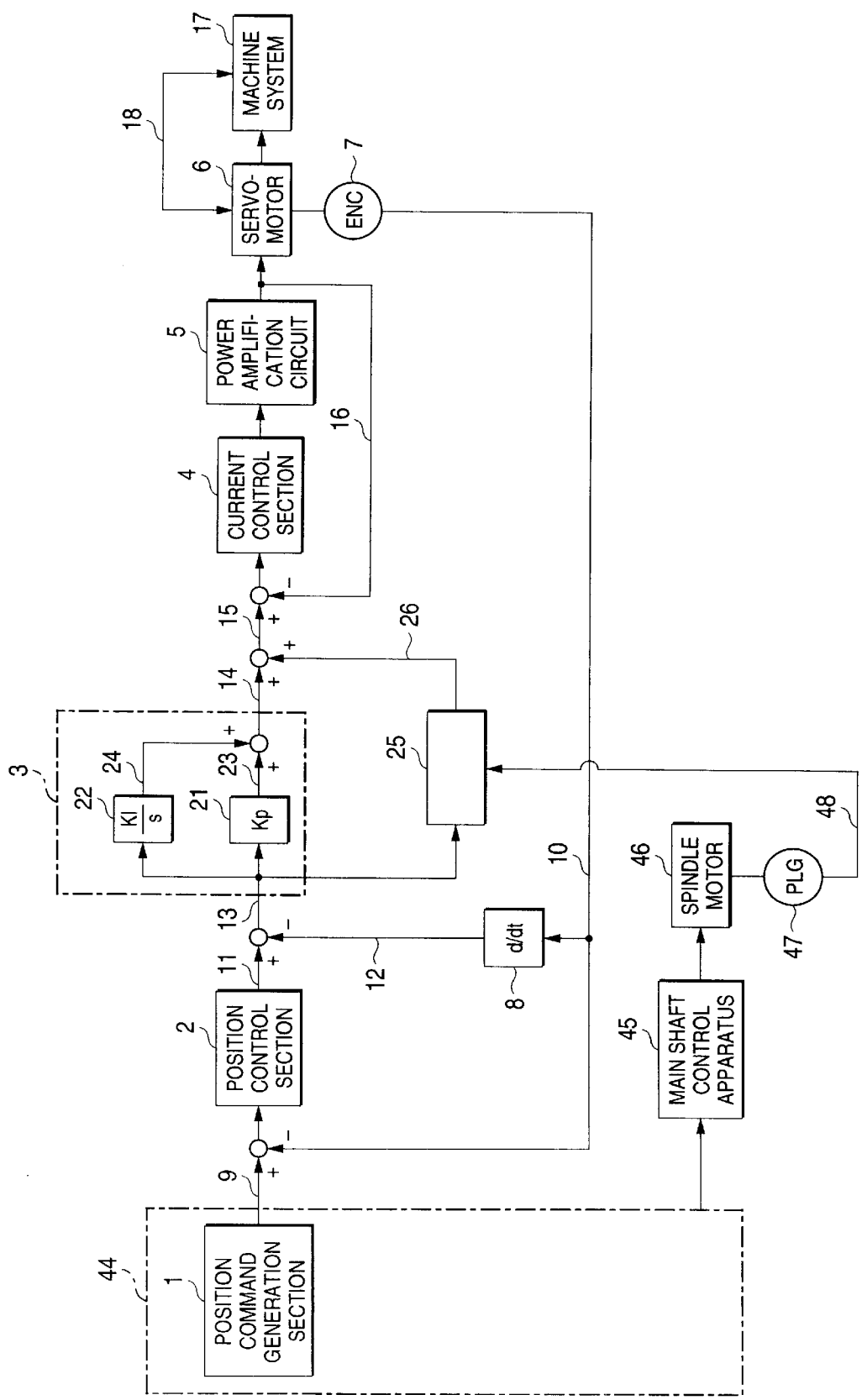
FIG. 9 is a block diagram to show a servo control apparatus according to an embodiment 5 of the invention.

FIG. 9 is a block diagram of a servo control apparatus according to the embodiment 5 of the invention; it is similar to FIG. 1 except that a periodical disturbance estimater 25 for calculating the correction value of the periodical disturbance 18 inputs an output signal 48 of a detector 47 such as PLG for detecting the rotation speed of a spindle motor 46 in place of a position signal 10.

The internal configuration of the periodical disturbance estimater 25 is similar to that in FIG. 2 except that the output signal 48 of the detector 47 is input in place of the position signal 10 of the servomotor 6 in FIG. 2.

If the disturbance 18 added to the servomotor 6 is a disturbance 18 caused by the rotation speed of the spindle motor 46 and the main shaft control apparatus 45 controlled by the same numerical control apparatus 44, in FIG. 9, the servo control apparatus directly monitors the rotation speed 48 of the spindle motor by the detector 47 such as PLG, inputs the spindle motor rotation speed signal 48, information of a proportionality constant between disturbance frequency and spindle motor rotation speed, and a difference signal 13 between a speed command and a speed feedback signal, and as in the embodiment 1, estimates gain $A^\wedge$ of a sine-wave component and gain $B^\wedge$ of a cosine-wave component forming the correction value of the periodical disturbance 18, multiplies the sine-wave component gain $A^\wedge$ and the cosine-wave component gain $B^\wedge$ by information provided based on the spindle motor rotation speed signal 48 and information provided based on the information of the proportionality constant between disturbance frequency and spindle motor rotation speed respectively, and sums the results, thereby calculating correction value 26 of the periodical disturbance 18.

Therefore, the correction value 26 is added to a current command 14 to generate a current command 15 given to the actual servomotor 16, whereby even if the disturbance 18 added to the servomotor 6 is the disturbance 18 caused by the rotation speed of the spindle motor 46 and the main shaft control apparatus 45 controlled by the same numerical control apparatus 44, it is made possible to suppress the effect of the disturbance in real time during the normal motor driving.

In the embodiments described above, if a plurality of disturbances different in frequency exist, a plurality of the periodical disturbance estimater 25 may be placed in parallel.

As described above, according to the invention, the servo control apparatus comprises detection means for detecting the position and speed of a motor, a position control section for generating a speed command based on the difference between a position command and a position feedback signal output by the above-mentioned detection means, a speed control section for generating a current command based on the difference between the above-mentioned speed command and a speed feedback signal, a current control section for controlling an electric current allowed to flow into the above-mentioned motor based on the above-mentioned current command, and a periodical disturbance estimater, if a disturbance having a frequency proportional to the rotation speed of the above-mentioned motor is loaded on (added to) a servo system containing a driven machine, the periodical disturbance estimater for inputting information of a proportionality constant between the disturbance frequency and the motor rotation speed, motor position information, and a difference signal between the above-mentioned speed command and the speed feedback signal and estimating magnitudes of a sine-wave component and a cosine-wave component at the frequency of the disturbance in real time during the normal motor driving, wherein the sine-wave component and the cosine-wave component at the frequency of the disturbance estimated are combined and the result is added to the above-mentioned current command as a correction value in real time during the normal motor driving, so that if the disturbance having a frequency proportional to the motor rotation speed is loaded on (added to) the servo system containing the driven machine, phase tuning executed in the periodical disturbance correction made in the related art is not required and detection can be made while correction is executed in real time.

This provides the advantage that if the correction amount (gain) and the phase deviate due to change in the disturbance frequency caused by change in the motor rotation speed during motor rotating such as actual cutting, the correction amount is corrected in real time and thus correction is made with no phase delay in all the speed range of one speed or more and a good cutting result can be produced.

Since the correction is made in real time, the advantage that the need for tuning the phase and the correction gain for each machine conducted by a human being is also eliminated is provided.

According to the invention, the servo control apparatus comprises detection means for detecting the position and speed of a motor, a position control section for generating a speed command based on the difference between a position command and a position feedback signal output by the above-mentioned detection means, a speed control section for generating a current command based on the difference between the above-mentioned speed command and a speed feedback signal, a current control section for controlling an electric current allowed to flow into the above-mentioned motor based on the above-mentioned current command, and a periodical disturbance estimater, if a disturbance loaded on (added to) a servo system has a machine-proper fixed frequency, the periodical disturbance estimater for inputting information of the machine-proper frequency and a difference signal between the speed command and the speed feedback signal and estimating magnitudes of a sine-wave component and a cosine-wave component at the frequency of the disturbance in real time during the normal motor driving, wherein the sine-wave component and the cosine-wave component at the frequency of the disturbance estimated are combined and the result is added to the above-mentioned current command as a correction value in real time during the normal motor driving, so that even if the disturbance caused by the machine-proper frequency adversely affects the cutting accuracy, phase tuning executed in the periodical disturbance correction in the related art is not required and while the disturbance component is detected with no effect of a phase delay in real time, correction can be made and the effect of the disturbance can be suppressed.

According to the invention, the servo control apparatus comprises detection means for detecting the position and speed of a motor, a position control section for generating a speed command based on the difference between a position command and a position feedback signal output by the above-mentioned detection means, a speed control section for generating a current command based on the difference between the above-mentioned speed command and a speed feedback signal, a current control section for controlling an electric current allowed to flow into the above-mentioned motor based on the above-mentioned current command, and a periodical disturbance estimater, if a disturbance having a frequency proportional to the rotation speed of the above-mentioned motor is loaded on (added to) a servo system containing a driven machine, the periodical disturbance estimater for inputting information of a proportionality constant between the disturbance frequency and the motor rotation speed, motor position information, and an output signal from an external displacement sensor attached to a machine end and estimating magnitudes of a sine-wave component and a cosine-wave component at the frequency of the disturbance in real time during the normal motor driving, wherein the sine-wave component and the cosine-wave component at the frequency of the disturbance estimated are combined and the result is added to the above-mentioned current command as a correction value in real time during the normal motor driving, so that even if fluctuation caused by the periodical disturbance does not appear in the speed feedback signal or a current feedback signal that can be detected as the servo control apparatus and the effect of the disturbance appears only at the machine end, adversely affecting the cutting accuracy, while the disturbance component is detected with no effect of a phase delay in real time, correction can be made and the effect of the disturbance can be suppressed.

According to the invention, the servo control apparatus comprises detection means for detecting the position and speed of a motor, a position control section for generating a speed command based on the difference between a position command and a position feedback signal output by the above-mentioned detection means, a speed control section for generating a current command based on the difference between the above-mentioned speed command and a speed feedback signal, a current control section for controlling an electric current allowed to flow into the above-mentioned motor based on the above-mentioned current command, and a periodical disturbance estimater, if a disturbance loaded on (added to) a servo system has a machine-proper fixed frequency, the periodical disturbance estimater for inputting information of the machine-proper frequency and an output signal from an external displacement sensor attached to a machine end and estimating magnitudes of a sine-wave component and a cosine-wave component at the frequency of the disturbance in real time during the normal motor driving, wherein the sine-wave component and the cosine-wave component at the frequency of the disturbance estimated are combined and the result is added to the above-mentioned current command as a correction value in real time during the normal motor driving, so that even if fluctuation caused by the periodical disturbance does not appear in the speed feedback signal or a current feedback signal that can be detected as the servo control apparatus and the effect of the disturbance appears only at the machine end, adversely affecting the cutting accuracy, while the disturbance component is detected with no effect of a phase delay in real time, correction can be made and the effect of the disturbance can be suppressed.

Further, according to the invention, the servo control apparatus comprises detection means for detecting the position and speed of a motor, a position control section for generating a speed command based on the difference between a position command and a position feedback signal output by the above-mentioned detection means, a speed control section for generating a current command based on the difference between the above-mentioned speed command and a speed feedback signal, a current control section for controlling an electric current allowed to flow into the above-mentioned motor based on the above-mentioned current command, detection means for detecting rotation speed of a main shaft, and a periodical disturbance estimater, if a disturbance proportional to the rotation speed of the main shaft is added to a servo system, the periodical disturbance estimater for inputting information of a proportionality constant between the disturbance frequency and the rotation speed of the main shaft, information of the rotation speed of the main shaft, and a difference signal between the above-mentioned speed command and the speed feedback signal and estimating magnitudes of a sine-wave component and a cosine-wave component at the frequency of the disturbance in real time during the normal motor driving, wherein the sine-wave component and the cosine-wave component at the frequency of the disturbance estimated are combined and the result is added to the above-mentioned current command as a correction value in real time during the normal motor driving, so that even if the disturbance added to the servomotor is a disturbance caused by the rotation speed of the spindle motor and the main shaft control apparatus controlled by the same numerical control apparatus, it is made possible to suppress the effect of the disturbance in real time during the normal motor driving.

Industrial Applicability

The servo control apparatus according to the invention is fitted for use in control of a machine tool with the cutting accuracy degraded due to the periodical disturbance.

What is claimed is:

1. A servo control apparatus of a servo system using a servomotor for controlling positions of feed shafts of a machine tool and a drive, wherein a disturbance having a frequency proportional to a rotation speed of the servomotor is loaded on the servo system containing a driven machine, said servo control apparatus comprising:

detection means for detecting a position and the rotation speed of the servomotor, a position control section for generating a speed command based on a difference between a position command and a position feedback signal output by said detection means, a speed control section for generating a current command based on a difference between the speed command and a speed feedback signal, a current control section for controlling an electric current allowed to flow into the servomotor based on the current command, and a periodical disturbance estimater for inputting information of a proportionality constant between the disturbance frequency and the servomotor rotation speed, servomotor position information, and a difference signal between the speed command and the speed feedback signal, estimating magnitudes of a sine-wave component and a cosine-wave component at the frequency of the disturbance in real time during normal servomotor driving, and combining the sine-wave component and the cosine-wave component at the frequency of the disturbance estimated to generate a correction value, wherein the correction value is added to the current command in real time during the normal servomotor driving.

2. A servo control apparatus of a servo system using a servomotor for controlling positions of feed shafts of a machine tool and a drive, wherein a disturbance loaded on the servo system has a machine-specific fixed frequency, said servo control apparatus comprising:

detection means for detecting a position and rotation speed of the servomotor, a position control section for generating a speed command based on a difference between a position command and a position feedback signal output by said detection means, a speed control section for generating a current command based on a difference between the speed command and a speed feedback signal, a current control section for controlling an electric current allowed to flow into the servomotor based on the current command, and a periodical disturbance estimater for inputting information of the machine-specific frequency and a difference signal between the speed command and the speed feedback signal, estimating magnitudes of a sine-wave component and a cosine-wave component at the frequency of the disturbance in real time during the normal servomotor driving, and combining the sine-wave component and the cosine-wave component at the frequency of the disturbance estimated to generate a correction value, wherein the correction value is added to the current command in real time during the normal servomotor driving.

3. A servo control apparatus of a servo system using a servomotor for controlling positions of feed shafts of a machine tool and a drive, wherein a disturbance having a frequency proportional to a rotation speed of the servomotor is loaded on the servo system containing a driven machine, said servo control apparatus comprising:

detection means for detecting a position and speed of the servomotor, a position control section for generating a speed command based on a difference between a position command and a position feedback signal output by said detection means, a speed control section for generating a current command based on a difference between the speed command and a speed feedback signal, a current control section for controlling an electric current allowed to flow into the servomotor based on the current command, and a periodical disturbance estimater said periodical disturbance estimater for inputting information of a proportionality constant between the disturbance frequency and the servomotor rotation speed, servomotor position information, and an output signal from an external displacement sensor attached to a machine end, estimating magnitudes of a sine-wave component and a cosine-wave component at the frequency of the disturbance in real time during normal servomotor driving, and combining the sine-wave component and the cosine-wave component at the frequency of the disturbance estimated to generate a correction value, wherein the correction value is added to the current command in real time during the normal servomotor driving.

4. A servo control apparatus of a servo system using a servomotor for controlling positions of feed shafts of a machine tool and a drive, wherein a disturbance loaded on the servo system has a machine-specific fixed frequency, said servo control apparatus comprising:

detection means for detecting a position and rotation speed of the servomotor, a position control section for generating a speed command based on a difference between a position command and a position feedback signal output by said detection means, a speed control section for generating a current command based on a difference between the speed command and a speed feedback signal, a current control section for controlling an electric current allowed to flow into the servomotor based on the current command, and a periodical disturbance estimater for inputting information of the machine-specific frequency and an output signal from an external displacement sensor attached to a machine end, estimating magnitudes of a sine-wave component and a cosine-wave component at the frequency of the disturbance in real time during normal servomotor driving, and combining the sine-wave component and the cosine-wave component at the frequency of the disturbance estimated to generate a correction value, wherein the correction value is added to the current command in real time during the normal servomotor driving.

5. A servo control apparatus of a servo system using a servomotor for controlling positions of feed shafts of a machine tool and a drive, wherein a disturbance proportional to the rotation speed of the main shaft is added to the servo system, said servo control apparatus comprising:

detection means for detecting a position and rotation speed of the servomotor, a position control section for generating a speed command based on a difference between a position command and a position feedback signal output by said detection means, a speed control section for generating a current command based on a difference between the speed command and a speed feedback signal, a current control section for controlling an electric current allowed to flow into the servomotor based on the current command, detection means for detecting rotation speed of a main shaft, and a periodical disturbance estimater for inputting information of a proportionality constant between the disturbance frequency and the rotation speed of the main shaft, information of the rotation speed of the main shaft, and a difference signal between the speed command and the speed feedback signal, estimating magnitudes of a sine-wave component and a cosine-wave component at the frequency of the disturbance in real time during normal servomotor driving, and combining the sine-wave component and the cosine-wave component at the frequency of the disturbance estimated to generate a correction value, wherein the correction value is added to the current command in real time during the normal servomotor driving.

* * * * *